United States Patent
Kenmochi et al.

[19]

[11] Patent Number: 5,849,122
[45] Date of Patent: Dec. 15, 1998

[54] METHOD OF FABRICATING VEHICLE BODY PANEL HAVING HONEYCOMB SANDWICH STRUCTURE

[75] Inventors: Toshihisa Kenmochi; Kazuyuki Okui; Hiroshi Osada; Takashi Maeda; Makoto Shiokawa; Tsuyoshi Yamashita; Mitsuo Nakamura, all of Wako, Japan

[73] Assignee: Honda Giken Kogyo Kabushiki Kaisa, Tokyo, Japan

[21] Appl. No.: 900,769

[22] Filed: Jun. 19, 1992

Related U.S. Application Data

[63] Continuation of Ser. No. 512,627, Apr. 19, 1990, abandoned, which is a continuation of Ser. No. 263,921, Oct. 28, 1988, abandoned.

[30]     Foreign Application Priority Data

| Nov. 2, 1987 | [JP] | Japan | 62-166784 |
| Nov. 2, 1987 | [JP] | Japan | 62-166785 |
| Nov. 4, 1987 | [JP] | Japan | 62-277275 |
| Nov. 4, 1987 | [JP] | Japan | 62-277276 |
| Nov. 4, 1987 | [JP] | Japan | 62-277277 |
| Nov. 4, 1987 | [JP] | Japan | 62-277278 |
| Mar. 7, 1988 | [JP] | Japan | 63-51561 |

[51] Int. Cl.[6] .................................................. B32B 31/00
[52] U.S. Cl. ............................. 156/182; 29/430; 29/469; 29/469.5; 156/278; 156/281; 156/293; 156/303.1; 156/306.6; 156/320; 156/321; 156/324.4; 296/191
[58] Field of Search ................................. 156/182, 281, 156/320, 321, 306.6, 324.4, 303.1, 293, 278; 29/430, 469, 469.5; 296/191

[56]             References Cited

U.S. PATENT DOCUMENTS

| 2,116,771 | 5/1938 | Seaman . | |
| 2,126,607 | 4/1938 | Boehner . | |
| 2,226,790 | 12/1940 | Valletta . | |
| 2,757,447 | 8/1956 | Barenyi | 29/430 |
| 3,177,031 | 4/1965 | Schilberg . | |
| 3,409,198 | 11/1968 | Peterman | 156/281 |
| 3,419,303 | 12/1968 | Eggert, Jr. . | |

(List continued on next page.)

FOREIGN PATENT DOCUMENTS

| 693866 | 9/1964 | Canada . | |
| 2 129 049 | 12/1972 | Germany . | |
| 36 43 688 | 7/1987 | Germany . | |
| 61-249853 | 11/1961 | Japan . | |
| 57-84267 | 5/1982 | Japan . | |
| 58-170940 | 10/1983 | Japan | 156/320 |
| 58-218472 | 12/1983 | Japan . | |
| 513.171 | 10/1939 | United Kingdom . | |
| 2 115 753 | 9/1983 | United Kingdom . | |
| 2115753 | 9/1983 | United Kingdom . | |

OTHER PUBLICATIONS

Patent Abstracts of Japan, vol. 8, No. 73, Apr. 5, 1984 & JP 58 218 472.
French Search Report dated Dec. 28, 1992.

*Primary Examiner*—John J. Gallagher
*Attorney, Agent, or Firm*—Armstrong, Westerman, Hattori, McLeland & Naughton

[57]               ABSTRACT

A vehicle body panel having a honeycomb sandwich structure in which a honeycomb core is sandwiched between a first and a second plate includes a subhoneycomb panel formed by adhering the first plate to one major surface of the honeycomb core beforehand. The subhoneycomb panel is pressed against the second plate which is constituted by a part of a structural panel of a vehicle body with the intermediary of an adhesive layer, the other major surface of the honeycomb core being adhered to the second plate. The connection of the subhoneycomb panel to the second plate is performed after the structural panel has been connected to a strength member of the vehicle body, e. g. after a washing stage. Such a vehicle body panel with a honeycomb sandwich structure is achievable without resorting to any substantial modification of an existing vehicle body assembly line.

13 Claims, 4 Drawing Sheets

U.S. PATENT DOCUMENTS

| | | |
|---|---|---|
| 3,940,176 | 2/1976 | Ito et al. . |
| 4,081,197 | 3/1978 | Ackel . |
| 4,129,330 | 12/1978 | Schwuchow . |
| 4,175,631 | 11/1979 | Ishii et al. . |
| 4,417,829 | 11/1983 | Hurten et al. . |
| 4,457,555 | 7/1984 | Draper . |
| 4,461,796 | 7/1984 | Fukahori et al. . |
| 4,475,765 | 10/1984 | Vogt et al. . |
| 4,585,086 | 4/1986 | Hiramatsu . |
| 4,593,949 | 6/1986 | Tanimoto . |
| 4,606,959 | 8/1986 | Hillinger . |
| 4,644,631 | 2/1987 | Shock ........................................ 29/460 |
| 4,728,383 | 3/1988 | Kaller et al. ........................... 156/293 |
| 4,730,829 | 3/1988 | DeRees . |

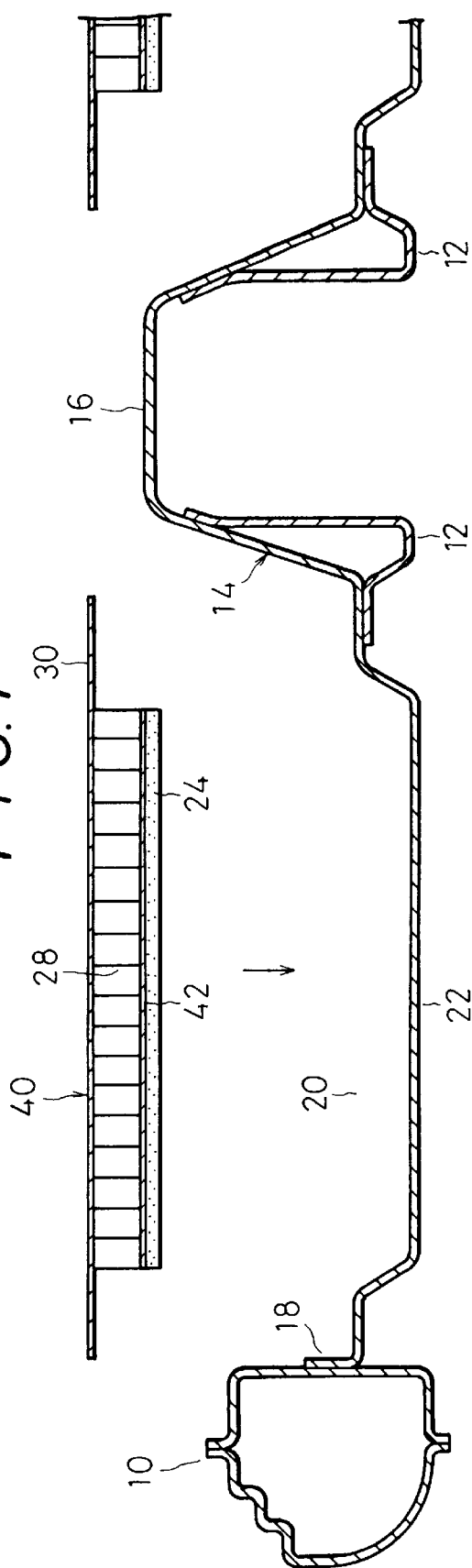
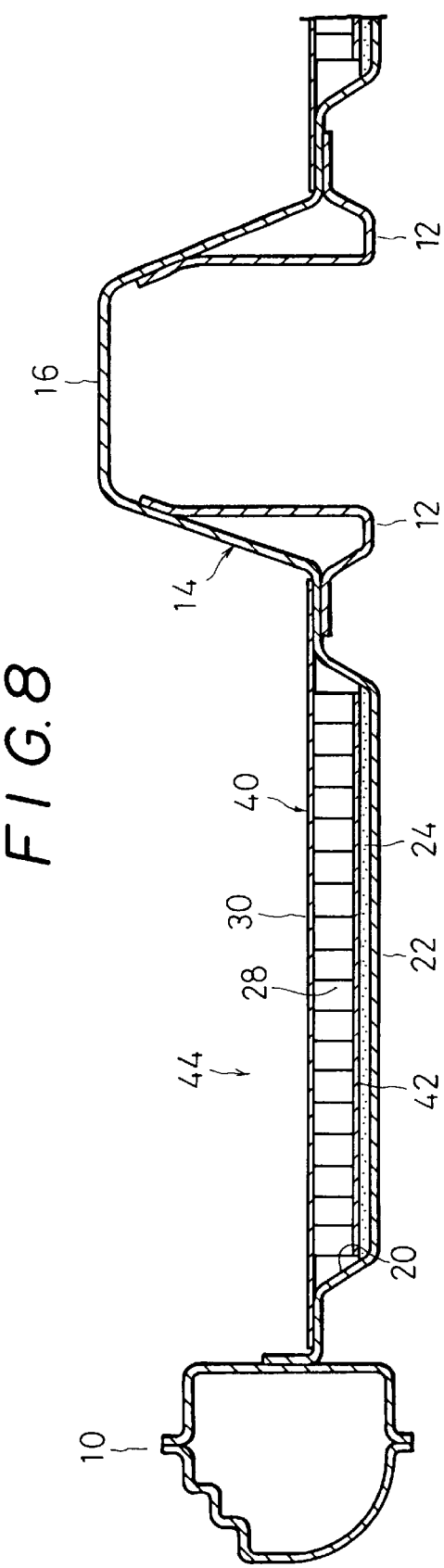

METHOD OF FABRICATING VEHICLE BODY PANEL HAVING HONEYCOMB SANDWICH STRUCTURE

This application is a continuation of application Ser. No. 07/512,627 filed Apr. 19, 1990 (now abandoned), which is in turn a continuation of Ser. No. 07/263,921 filed Oct. 28, 1988, now abandoned.

BACKGROUND OF THE INVENTION

The present invention relates to a method of constructing a floor panel, dashboard panel or similar panel of a vehicle body into a honeycomb sandwich structure.

A motor vehicle is provided with relatively wide panels such as a floor panel and a dashboard panel each forming a part of the vehicle body. This kind of panel is usually implemented by a single plate and connected to a side sill, front pillar extension or similar strength member which is included in the framework of a vehicle body.

A problem with such a wide panel is that it is apt to undergo vibrations in a plane due to the vibrations of a vehicle body and the vibrations of an engine which is mounted on the vehicle body. When the panel vibrates so due to the vibrations of an engine, it transmits noise of the engine to a passenger compartment. While a panel of this kind forms a part of a vehicle body and therefore has to restrain the vibrations of the vehicle body, it is impractical to achieve a sufficient degree of vibration control with a single wide plate.

In light of this, it has been customary to connect a cross member or similar reinforcing member to a vehicle body panel in the form of a single panel so as to provide the panel with rigidity while adhering a mer-sheet to the panel to enhance vibration restraint and sound insulation, as disclosed in Japanese Laid-Open Patent Publication (Kokai) No. 58-2183472. The mer-sheet is a commercially available vibration control material whose major component is asphalt. Such a scheme, however, brings about another drawback that the overall weight of the vehicle body is increased and, moreover, it is difficult to uniformly enhance the rigidity over the entire area of the panel.

Another approach is the use of a honeycomb sandwich structure which is applicable to a roof panel of a motor vehicle, for example, as shown and described in U.S. Pat. No. 4,475,765. A panel with a honeycomb sandwich structure is made up of two plates and a honeycomb core sandwiched between the two plates. This type of panel is light weight and, yet, highly rigid, vibration restrainable and sound insulative.

Having such rigidity, a panel with a honeycomb sandwich structure can hardly be shaped by press-forming. Hence, a honeycomb sandwich panel fabricated beforehand cannot be applied to a vehicle body without connecting it to a side sill or similar strength member of the vehicle body. Generally, when various strength members of a vehicle body are assembled to form a framework together, some distortions necessarily occur in the framework because the individual strength members suffer from machining errors, assembling errors, thermal deformations due to welding, etc. A honeycomb sandwich panel which is extremely rigid as stated above cannot adapt itself to such distortions of the framework and therefore cannot be bonded to the framework. Furthermore, this kind of panel cannot be simply fastened to other members by spot welding, bolting or similar technology because a substantial part of the honeycomb core held between two plates is hollow. Although a special fixing method may be elaborated for connecting the panel to other members, it requires large-scale modifications of an existing vehicle body assembly line.

To eliminate the above-discussed drawbacks, a vehicle body assembly line may be so arranged as to allow a vehicle body panel to be constructed into a honeycomb sandwich structure within the vehicle body assembly line. More specifically, the arrangement of a vehicle body assembly line may be such that one of two plates which constitute the honeycomb sandwich structure is shaped and connected to a strength member of a vehicle body, then the honeycomb core is connected to the plate, and then the other plate is connected to the honeycomb core. In general, however, a honeycomb core applicable to a vehicle body panel needs to be light weight and inexpensive and is therefore often formed from paper. A honeycomb core made of paper has to be connected to plates by adhesive, and a floor panel or a dashboard panel has a large area. Hence, interconnecting two plates and a honeycomb core one after another is time-consuming and, when included in a vehicle body assembly line, would affect the other assembling stages.

Furthermore, while the honeycomb core and two plates have to be surely connected together to take advantage of the characteristics of a honeycomb sandwich structure, cell walls which form the honeycomb core are so thin that the honeycomb core make line-to-line contact with the two plates. It is almost impracticable to surely adhere those portions of the honeycomb core which make line-to-line contact with the plates by an ordinary method within a vehicle body assembly line. Besides, introducing the honeycomb core and the plates into a vehicle body assembly line in a physically separate condition results in an increase in the number of parts and therefore in complicated control of parts.

SUMMARY OF THE INVENTION

It is therefore an object of the present invention to provide a method which allows a vehicle body panel to be constructed into a honeycomb sandwich structure without resorting to any substantial modification of an existing vehicle body assembly line.

It is another object of the present invention to provide a method which promotes easy and sure adhesion of a honeycomb core and plates to thereby implement inexpensive fabrication of a vehicle body panel having a honeycomb sandwich structure.

It is another object of the present invention to provide a method which allows a vehicle body panel with a honeycomb sandwich structure to be fabricated on a vehicle body assembly line without increasing the number of independent parts which should be conveyed to the assembly line.

In order to achieve the above objects, in accordance with the present invention, use is made of a subhoneycomb panel which is produced in a predetermined configuration by connecting one of two plates to a honeycomb core beforehand. The other plate is constituted by a part of a structural panel of a vehicle body structure. The subhoneycomb panel is transported to a vehicle body assembly line downstream of a stage where the structural panel is connected to strength members of a vehicle body. The subhoneycomb panel is pressed against the structural panel through an adhesive layer, whereby the honeycomb core is adhered to one of the plates which is constituted by a part of the structural panel. By such a procedure, the plates are individually connected to the opposite major surfaces of the honeycomb core to form a vehicle body panel having a honeycomb sandwich structure.

In a preferred embodiment of the present invention, the adhesive layer is implemented by an asphalt-base adhesive which is a vibration control material and therefore further enhances the vibration restraining function of the vehicle body panel. The mer-sheet is inexpensive and, due to its inherent configuration, easy to adhere. The asphalt-base adhesive may be adhered to the subhoneycomb panel before it is introduced into a vehicle body assembly line, so as to further reduce the number of parts to be conveyed to the assembly line.

In another preferred embodiment, the adhesion of the subhoneycomb panel to the structural panel is performed after a washing step of a vehicle body painting stage. This allows the adhesive layer to exhibit its function due to heat or remaining heat while a vehicle body is dried, thereby eliminating the need for an extra heating step. Since the honeycomb core is fully kept from water, it can be made of paper.

In still another preferred embodiment, one plate which constitutes the honeycomb sandwich structure is connected to one major surface of the honeycomb core while an auxiliary plate for adhesion is connected to the other major surface. In such a structure, the subhoneycomb panel and the other plate which constitutes the honeycomb sandwich structure are held in surface-to-surface contact with each other and therefore can be adhered together easily and surely.

In accordance with the present invention, a method of fabricating a panel of a vehicle body having a honeycomb sandwich structure which comprises a first plate, a second plate, and a honeycomb core sandwiched between the first and second plates comprises the steps of adhering the first plate to one of opposite major surfaces of the honeycomb core beforehand to form a subhoneycomb panel having a predetermined shape, constituting the second plate by a part of a structural panel which is included in a vehicle body structure, connecting the structural panel to a strength member which is included in a framework of the vehicle body, and pressing the subhoneycomb panel against the second plate which is constituted by the part of the structural panel with the intermediary of an adhesive layer while adhering the other major surface of the honeycomb core to the second plate.

Further, in accordance with the present invention, a method of fabricating a panel of a vehicle body having a honeycomb sandwich structure which comprises a first plate, a second plate and a honeycomb core sandwiched between the first and second plates comprises the steps of adhering the first plate to one of opposite major surfaces of the honeycomb core and adhering an auxiliary plate for adhesion to the other major surface of the honeycomb core to form a subhoneycomb panel having a predetermined shape, constituting the second plate by a part of a structural panel which is included in a vehicle body structure, connecting the structural panel to a strength member which is included in a framework of the vehicle body, and pressing the subhoneycomb panel against the second plate which is constituted by the part of the structural panel with the intermediary of an adhesive layer while adhering the auxiliary plate of the subhoneycomb panel to the second plate.

BRIEF DESCRIPTION OF THE DRAWINGS

The above and other objects, features and advantages of the present invention will become more apparent from the following detailed description taken with the accompanying drawings in which:

FIGS. 5, 6 and 7 are views similar to FIG. 2, each showing an alternative embodiment of the present invention; and FIG. 8 is a section similar to FIG. 2, showing a vehicle body panel fabricated by the method of FIG. 7.

DESCRIPTION OF THE PREFERRED EMBODIMENTS

Figure 1:
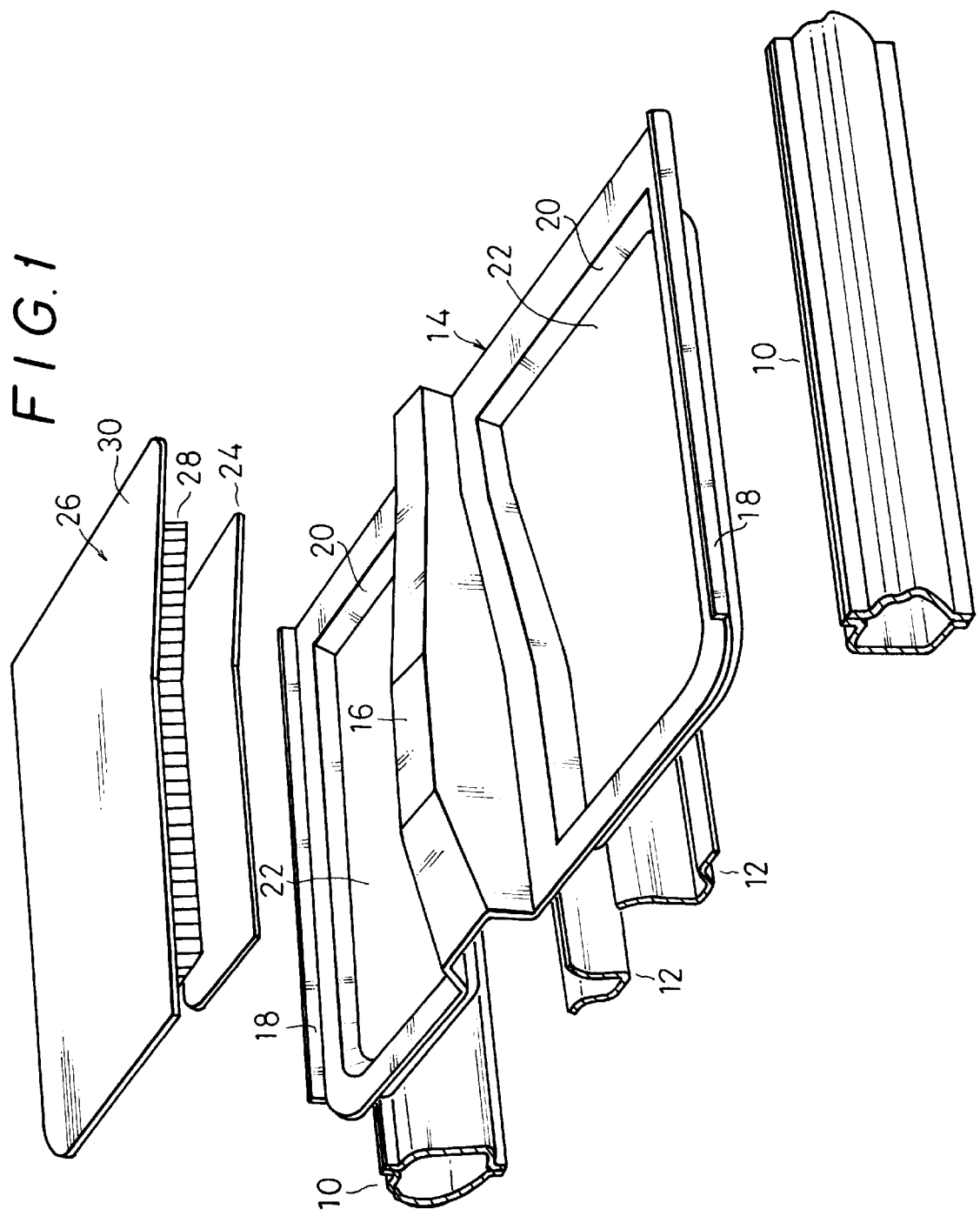
FIG. 1 is an exploded perspective view showing a floor panel of a vehicle body representative of a vehicle body panel which may be fabricated by a method of the present invention.
Figure 2:
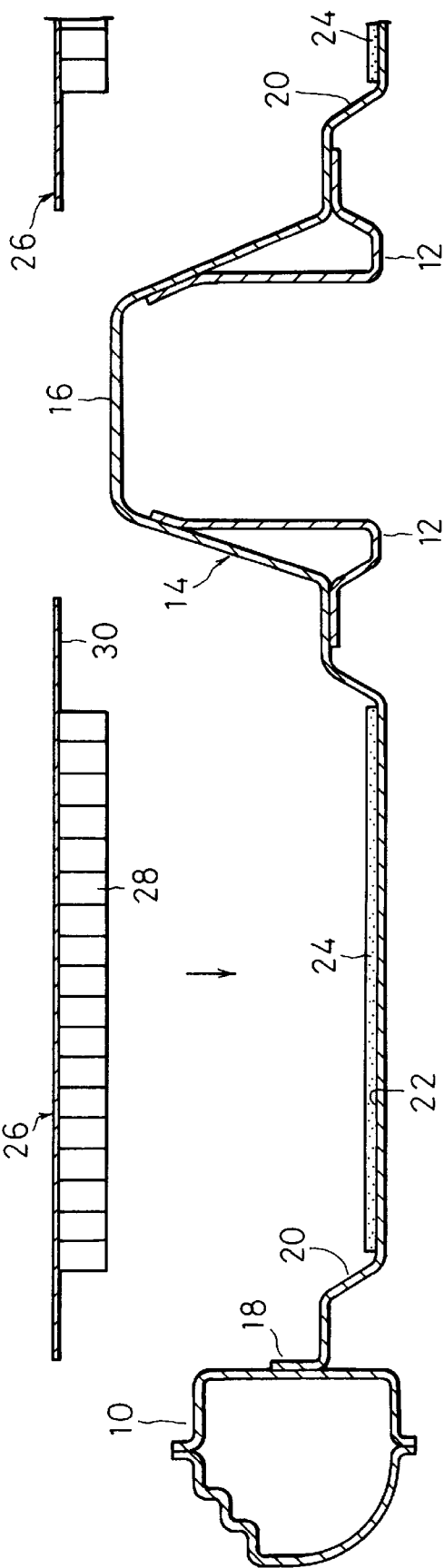
FIG. 2 is a vertical section of the floor panel of FIG. 1 as viewed in the lateral direction of a vehicle body, showing one embodiment of the method in accordance with the present invention.
Figure 3:
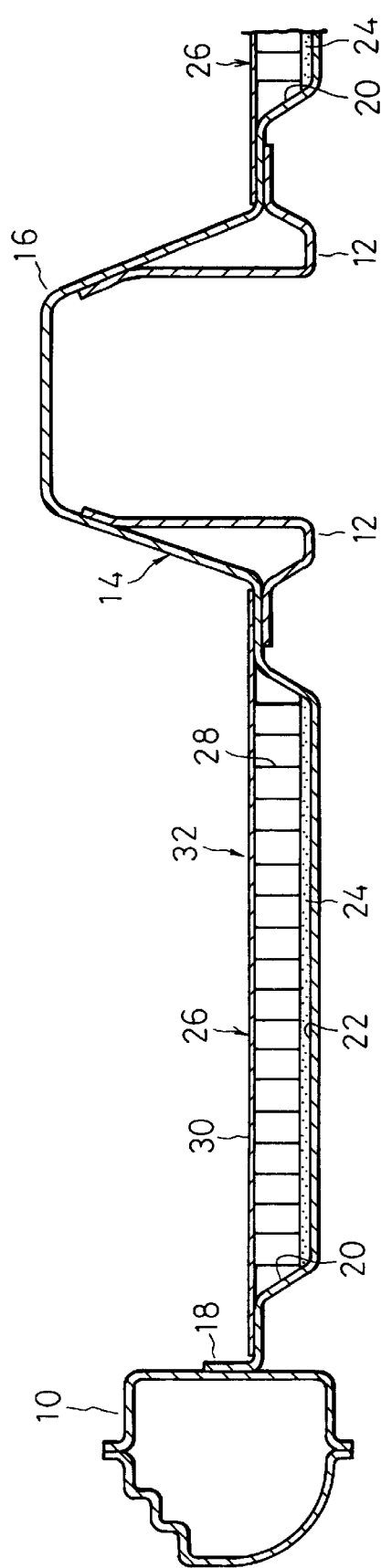
FIG. 3 is a view similar to FIG. 2, showing a floor panel fabricated by the method of FIG. 2.

Referring to FIGS. 1 to 3, a floor panel of a vehicle body which is implemented by a method of the present invention is shown. In the figures, the vehicle body includes a pair of side sills 10 which are located at laterally opposite sides of that part of the floor panel which defines the floor of a vehicle compartment. Each side sill 10 extends in the longitudinal direction of the vehicle body. A pair of center frames 12 extend in the longitudinal direction of the vehicle body and in a central part of the vehicle body which intervenes between the side sills 10. The side sills 10 and the center frames 12 are interconnected by cross members (not shown) at longitudinally opposite ends thereof to constitute a framework of the vehicle floor portion.

A single comparatively wide panel 14 is disposed between the side sills 10. Having substantially the same configuration as the floor panel of an ordinary vehicle body structure, the panel 14 is formed with a center tunnel 16 at its intermediate portion and flanges 18 at its laterally opposite edges. The panel 14 is connected to the side sills 10 through the flanges 18. The center tunnel 16 is connected to the upper ends of the center frames 12 while sitting astraddle the latter. The panel 14 therefore serves as a structural panel which is connected between strength members which in turn constitute the framework of the vehicle body.

The structural panel 14 is provided with recesses 20 each having a large area at opposite sides of the center tunnel 16. More specifically, each recess 20 extends between the center tunnel 16 and the right or left flange 18 and has a substantially flat bottom wall 22. As shown in FIGS. 1 to 3, the structural panel 14 is preferably integral to the flat bottom wall 22. A subhoneycomb panel 26 is seated on the bottom 22 of each recess 20 with the intermediary of a mer-sheet 24 which serves as an adhesive layer.

The subhoneycomb panel 26 is made up of a plate-like honeycomb core 28 and a first plate 30 which is rigidly connected to the upper surface of the honeycomb core 28. The honeycomb core 28 is so dimensioned as to be received in any of the recesses 20 associated therewith and adhered at its underside to the bottom wall 22 of the recess 20 by the asphalt-base adhesive 24. On the other hand, the first plate 30 is dimensioned to fully cover the recess 20 while overlapping that portion of the panel 14 which surrounds the recess 20 at its peripheral portion. The honeycomb core 28 is made of paper while the first plate 30 is formed from a sheet of steel which is thinner than the structural panel 14, aluminum, resin, paper or similar material. The honeycomb core 28 and first plate 30 are rigidly connected together by adhesive to constitute a single unit.

The honeycomb sandwich structure having the honeycomb core 28 between the first plate 30 and the bottom wall 22 of the recess 20 defines a floor panel 32 which extends between the center tunnel 16 and associated one of the side sills 10. In this configuration, the bottom wall 22 of the recess 20 which forms a part of the structural panel 14 serves as a second plate of the honeycomb sandwich structure.

A method of producing the floor panel 32 having such a honeycomb sandwich structure will be described.

First, the honeycomb core 28 and first plate 30 are connected together by adhesive to form the subhoneycomb panel 26 by using a production line which is independent of a vehicle body assembly line. The independent production line allows the subhoneycomb panel 26 to be fabricated without effecting other various steps of the vehicle body assembly line. Hence, a substantial period of time can be allocated to the adhesion of the honeycomb core 28 and first plate 30 so as to promote sure and rigid connection of the latter.

On the vehicle body assembly line, the side sills 10, center frames 12 and other strength members of the vehicle body are assembled to complete the framework of a vehicle body as with the prior art assembly line. A single sheet steel is press-formed to produce the structural panel 14 having the large recesses 20 in addition to the conventional center tunnel 16 and flanges 18. The resulting structural panel 14 is connected to the side sills 10 and center frames 12. It is noteworthy that the configuration of the recesses 20 enhances the rigidity of the structural panel 14 and therefore facilitates the transport, connection and other operations associated with the panel 14.

A white body completed by such a vehicle body assembly line is conveyed to a painting stage, then washed, and then dried. It is a common practice with a vehicle body assembly line to provide an asphalt-base adhesive adhering step in or immediately after a drying step. By using this particular step, the asphalt-base adhesive 24 are adhered to the bottom walls 22 of their associated recesses 20 of the structural panel 14, as shown in FIG. 2. Then, the asphalt-base adhesive 24 are melted by heat or remaining heat particular to the drying step and thereby intimately engaged with the bottom walls 22 of the recesses 20.

In the above condition, the subhoneycomb panels 26 formed beforehand are brought to the vehicle body assembly line. After the subhoneycomb panels 26 have been loaded on the structural panel 14 with the honeycomb cores 28 being individually received in the recesses 20, they are pressed from above by laying weights on the first plates 30, for example. At this instant, each subhoneycomb panel 26 is positioned accurately and easily relative to the structural panel 14 because the honeycomb core 28 is received in the recess 20.

Figure 4:
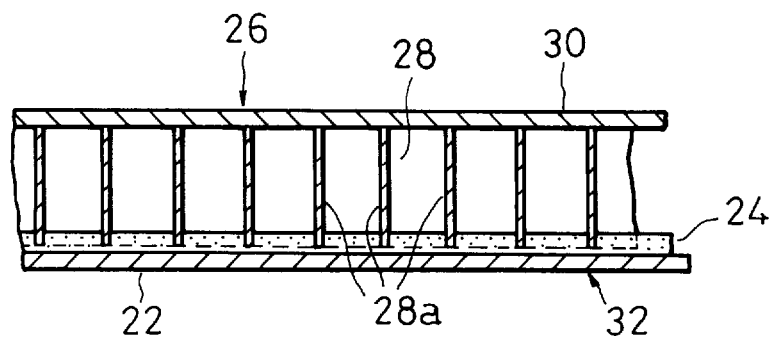
FIG. 4 is a fragmentary enlarged view of the floor panel shown in FIG. 3.

When each subhoneycomb panel 26 is pressed against the structural panel 14 as stated above, the ends of walls 28a of the honeycomb core 28 which define individual cells penetrate into the asphalt-base adhesive 24, as shown in FIG. 4. As a result, the honeycomb core 28 and the asphalt-base adhesive 24 make contact with each other over a substantial area. Further, since the cell walls 28a are made of paper, the asphalt-base adhesive 24 melted penetrates into the cell walls 28a. These in combination allow the asphalt-base adhesive 24 and the honeycomb core 28 to connect surely and firmly to each other when the sheet 24 is hardened by cooling. The subhoneycomb panel 26 is adhered to the structural panel 14 through the asphalt-base adhesive 24.

Since the subhoneycomb panel 26 with the thin plate 3D being adhered to only one surface thereof is relatively flexible, it can readily adapt itself to irregularities of the bottom wall 22 of the recess 20. Further, the asphalt-base adhesive 24 can absorb unnoticeable undulations of the bottom wall 22. It is possible therefore to connect the honeycomb core 28 evenly to the bottom wall 22 of the recess 20 over its entire area despite any machining error, assembling error and others of the structural panel 14. In addition, the tips of the cell walls 28a of the honeycomb core 28 which penetrate into the melt sheet 24 prevent the subhoneycomb panel 26 from being dislocated in the course of adhering operation, whereby the subhoneycomb panel 26 is adhered with accuracy.

As the honeycomb core 28 of the subhoneycomb panel 26 is pressed into the asphalt-base adhesive 24, air inside the individual cells of the core 28 is compressed. This, coupled with the fact that such air is expanded by heat, elevates the pressure within the cells. Nevertheless, the pressure inside the cells is readily released to the outside through the cell walls 28a because the cell walls 28a of the honeycomb core 28 which is made of paper has permeability. Since the subhoneycomb panel 26 is set after washing which follows painting, the honeycomb core 28 made of paper is prevented from being damaged by water.

The subhoneycomb panel 26 is adhered to the structural panel 14 by the above procedure to complete the floor panel 32 having a honeycomb sandwich structure, as shown in FIG. 3. Such a honeycomb sandwich structure is attainable by using a conventional vehicle body assembly line without any noticeable modification. More specifically, the only additional step is transporting and setting the subhoneycomb panel 26 after the adhesion of the asphalt-base adhesive 24.

The honeycomb core 28 and the plate 30 need only to be conveyed to the vehicle body assembly line in the form of a single part, i. e. subhoneycomb panel 26. This reduces the number of parts compared to a case wherein they are transported independently of each other. The panel 26 has relatively great rigidity due to its subhoneycomb structure and therefore can be conveyed and set with ease.

The adhesive for adhering the subhoneycomb panel 26 to the structural panel 14 may be implemented by rubber, thermoplastic resin, thermosetting resin or foamable resin by way of example. Foamable resin will more efficiently absorb clearances between the honeycomb core 28 and the bottom wall 22 of the recess 20 ascribable to irregularities of the surface of the structural panel 14 than the other materials. When this kind of adhesive is used, it is only necessary to replace the asphalt-base adhesive adhering step of the vehicle body assembly line with an adhesive applying step and, in this alternative step, applying adhesive to the bottom 22 of the recess 20 to a substantial thickness.

However, using the asphalt-base adhesive 24 as described above is advantageous over applying adhesive to a substantial thickness and uniformly because the latter is time- and labor-consuming. More specifically, the asphalt-base adhesive 24 is not only easy to adhere but also provides the resulting floor panel 32 with a remarkable vibration control characteristic inasmuch as the sheet 24 itself is inherently vibration restrainable. In addition, the asphalt-base adhesive 24 and therefore the entire floor panel 32 is inexpensive.

Figure 5:
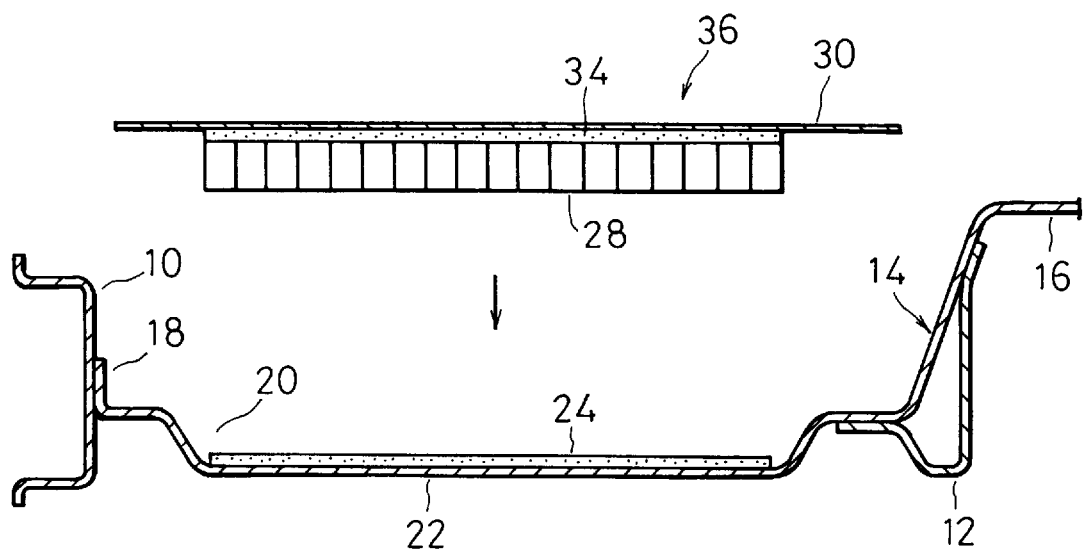

Referring to FIG. 5, an alternative embodiment of the present invention is shown. In this particular embodiment, the honeycomb core 28 and the first plate 30 are adhered to each other by an asphalt-base adhesive 34 so as to constitute a subhoneycomb panel 36. This kind of configuration promotes easier connection of the honeycomb core 28 and first plate 30 and therefore allows the subhoneycomb panel 36 to be assembled in parallel with the vehicle body assembly line. At the same time, the subhoneycomb panel 36 is provided with considerable flexibility to better adapt itself to the irregularities of the bottom wall 22 of the recess 20. Moreover, the vibration control characteristic of the resulting floor panel having a honeycomb structure is further enhanced.

Figure 6:
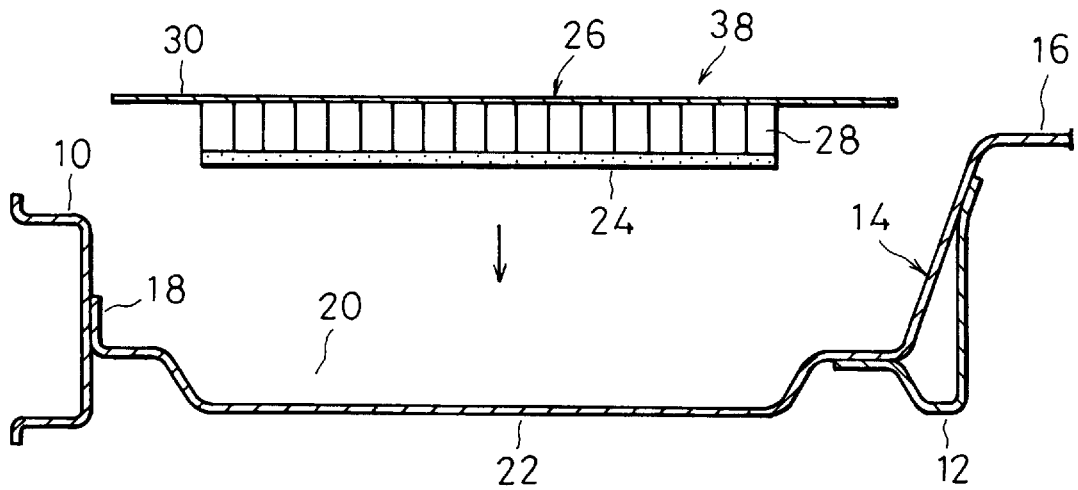

The asphalt-base adhesive 24 is an adhesive sheet having a substantial thickness. Hence, the asphalt-base adhesive 24 can be provisionally connected to the honeycomb core 28 by causing the ends of the cell walls 28a of the core 28 to penetrating into the asphalt-base adhesive 24. All that is required to construct the subhoneycomb panel 26 and the asphalt-base adhesive 24 into a single unit 38 as shown in FIG. 6 is applying the asphalt-base adhesive 24 to that surface of the honeycomb core 28 of the subhoneycomb panel 26, which has been formed beforehand, which is opposite to the first plate 30 and then pressing them lightly from both sides. By conveying such a unit 38 to an asphalt-base adhesive adhering stage of the vehicle body assembly line and then laying it on the bottom wall 22 of the recess 20, it is possible to complete a floor panel 32 having a honeycomb sandwich structure as that of FIG. 3. Since it is the single unit 38 that is introduced into the vehicle assembly line, much easier management of parts is promoted. Further, the existing vehicle assembly line is usable without any modification because the unit 38 needs only to be set as in the prior art asphalt-base adhesive adhering stage.

Referring to FIGS. 7 and 8, another alternative embodiment of the present invention is shown. In the figure, an auxiliary plate 42 is adhered to the surface of the honeycomb core 28 which is opposite to the surface where the first plate 30 is positioned. The auxiliary plate 42 may be implemented by a considerably thin sheet such as metal foil, resin film or paper. The honeycomb core 28, first plate 30 and auxiliary plate 42 are connected together by an exclusive line which is independent of the vehicle body assembly line and uses fast adhesive. This guarantees sure and rigid connection of such component parts.

The subhoneycomb panel 40 produced by the above procedure is conveyed to a asphalt-base adhesive adhering stage of a vehicle body assembly line with the asphalt-base adhesive 24 being provisionally adhered to the auxiliary plate 42, as shown in FIG. 7. Then, the unitary subhoneycomb panel 40 and asphalt-base adhesive 24 are laid on the structural panel 14 as in the previous embodiment. This causes the asphalt-base adhesive 24 to melt with the result that the auxiliary plate 42 and the bottom 22 of the recess 20 are adhered to each other. Consequently, the subhoneycomb panel 40 is securely connected to the structural panel 14 to complete the floor panel 44 having a honeycomb sandswich structure, as shown in FIG. 8.

The subhoneycomb panel 40 is connected at the auxiliary panel 42 to the bottom 22 of the recess 20, as stated above. Such a surface-to-surface adhesion insures an ample area of engagement and thereby fast and stable connection. The auxiliary plate 42 needs only to guarantee such an area of adhesion and therefore can be implemented by a flexible material as previously stated. The subhoneycomb panel 40 is therefore provided with a certain degree of flexibility which is sufficient to adapt to the irregularties of the structural panel 14. Errors in the plane accuracy between the auxiliary plate 42 and the bottom wall 22 of the recess 20 is absorbed by the asphalt-base adhesive 24. Since the subhoneycomb panel 40 is introduced into the asphalt-base adhesive adhering stage of the vehicle body assembly line which follows the washing stage, the honeycomb core 28 made of paper is free from damage otherwise caused by water and, in addition, the auxiliary plate 42 can be made of paper also. Furthermore, since the asphalt-base adhesive 24 is provisionally adhered to the subhoneycomb panel 40 beforehand, the floor panel 44 can be provided with a honeycomb sandwich structure without modifying an existing vehicle body assembly line.

As shown in FIG. 8, the auxiliary plate 42 and the structural panel 14 cooperate to form a double-layer structure at the underside of the honeycomb core 28. The double-layer structure enhances rigidity and sound insulation more efficiently than an ordinary simple honeycomb sandwich structure. The honeycomb sandwich structure, coupled with the fact that the vibration-restrainable asphalt-base adhesive 24 constitutes an adhesive layer, provides the floor panel 44 with an unprecedented degree of vibration control.

If desired, the subhoneycomb panel 40 and the asphalt-base adhesive 24 may be conveyed to a vehicle body assembly line in a physically separated condition as has been the case with the embodiment of FIG. 2.

While the present invention has been shown and described in relation to a floor panel, it is similarly applicable to a dashboard, roof panel or similar panel for providing it with a honeycomb sandwich structure. Especially, when a dashboard is implemented by a honeycomb core made of paper, it will efficiently isolate a passenger compartment from heat which is generated in an engine compartment.

What is claimed is:

1. A method of fabricating, within a vehicle body assembly line, a floor panel of a vehicle body having a honeycomb sandwich structure including a first plate, a second plate and a honeycomb core sandwiched between said first plate and said second plate, said second plate being an integral part of a structural panel of said vehicle body, said honeycomb sandwich structure being composed of a pre-formed subhoneycomb panel with a predetermined shape and including said first plate connected to a first surface of said honeycomb core, said method comprising the steps of:

strengthening said second plate by connecting said structural panel to a strength member, said second plate being integral to said structural panel, and said strength member being a part of a vehicle body framework;

pressing said pre-formed sub-honeycomb panel against said second plate with an adhesive layer therebetween to thereby connect a second surface of said honeycomb core to said second plate, said second surface of said honeycomb core being oppositely located to said first surface, wherein said honeycomb core is made of paper having permeability, wherein said step of pressing said subhoneycomb panel against said second plate occurs immediately after a drying step conducted after washing of a painting stage of said vehicle body to thereby prevent said honeycomb core from getting wet, wherein said step of pressing said sub-honeycomb panel includes the step of releasing pressure formed within said sub-honeycomb panel by said pressing step to thereby prevent damaging said sub-honeycomb core due to pressure inside a plurality of cells in said sub-honeycomb as a result of the pressing thereof onto said strengthened second plate.

2. A method as claimed in claim 1, wherein said step of pressing includes the step of pressing said sub-honeycomb panel against said second plate with an asphalt-base adhesive therebetween.

3. A method as claimed in claim 1, wherein said step of forming said sub-honeycomb panel includes the step of connecting said first plate to said honeycomb core with an asphalt-base adhesive.

4. A method as claimed in claim 1, wherein said structural panel includes a recess for accommodating said honeycomb core, said second plate being a bottom wall of said recess.

5. A method as claimed in claim 1, wherein said step of pressing includes the step of pressing said sub-honeycomb panel against said second plate with a sheet of adhesive material, and said method further comprising the step of adhering said sheet of adhesive material to said second surface of said honeycomb core prior to said step of pressing.

6. A method as claimed in claim 5, wherein said sheet includes an asphalt-base adhesive, wherein end portions of cell walls of said honeycomb core penetrate into said asphalt-base adhesive to adhere said mer-sheet to said sub-honeycomb panel.

7. A method as claimed in claim 1, further comprising the step of connecting said first plate to said structural panel of said vehicle body to thereby form said panel of said vehicle body.

8. A method as claimed in claim 7, wherein said step of connecting said first plate to said structural panel of said vehicle body includes the step of directly connecting end portions of said first plate to said structural panel of said vehicle body.

9. A method of fabricating, within a vehicle body assembly line, a floor panel of a vehicle body having a honeycomb sandwich structure including a first plate, a second plate and a honeycomb core sandwiched between said first plate and said second plate, said second plate being an integral part of a structural panel of said vehicle body, said honeycomb sandwich structure being composed of a pre-formed sub-honeycomb panel with a predetermined shape and including said first plate connected to a first surface of said honeycomb core and auxiliary plate connected to a second surface of said honeycomb core opposite said first surface, said method comprising the steps of:

strengthening said second plate by connecting said structural panel to a strength member, said second Plate being integral to said structural panel, and said strength member being a part of a vehicle body framework;

pressing said pre-formed sub-honeycomb panel against said second plate with an adhesive layer therebetween to thereby connect said auxiliary plate of said sub-honeycomb panel to said second plate, wherein said honeycomb core is made of paper having permeability, wherein said step of pressing said sub-honeycomb panel against said second plate occurs immediately after a drying step conducted after washing of a painting stage of said vehicle body to thereby prevent said honeycomb core from getting wet, wherein said step of pressing said sub-honeycomb panel includes the step of releasing pressure formed within said sub-honeycomb panel by said pressing step to thereby prevent damaging said sub-honeycomb core due to pressure inside a plurality of cells in said sub-honeycomb as a result of the pressing thereof onto said strengthened second plate.

10. A method as claimed in claim 9, wherein said step of pressing said sub-honeycomb panel against said second plate occurs immediately after a drying step conduction after washing of a painting stage of said vehicle body to thereby prevent said honeycomb core from getting wet.

11. A method as claimed in claim 9, wherein said step of pressing includes the step of pressing said sub-honeycomb panel against said second plate with an asphalt-base adhesive therebetween.

12. . A method as claimed in claim 9, further comprising the step of connecting said first plate to said structural panel of said vehicle body to thereby form said panel of said vehicle body.

13. A method as claimed in claim 12, wherein said step of connecting said first plate to said structural panel of said vehicle body includes the step of directly connecting end portions of said first plate to said structural panel of said vehicle body.

* * * * *